United States Patent
Shoji et al.

(10) Patent No.: US 8,973,245 B2
(45) Date of Patent: Mar. 10, 2015

(54) METHOD OF MANUFACTURING FLAT PANEL DETECTOR

(75) Inventors: Takehiko Shoji, Tokyo (JP); Keiko Itaya, Tokyo (JP); Masashi Kondo, Tokyo (JP); Makoto Iijima, Kanagawa (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 297 days.

(21) Appl. No.: 13/638,690

(22) PCT Filed: Feb. 25, 2011

(86) PCT No.: PCT/JP2011/054295
§ 371 (c)(1),
(2), (4) Date: Oct. 1, 2012

(87) PCT Pub. No.: WO2011/125383
PCT Pub. Date: Oct. 13, 2011

(65) Prior Publication Data
US 2013/0019462 A1   Jan. 24, 2013

(30) Foreign Application Priority Data
Apr. 7, 2010   (JP) .................................. 2010-088512

(51) Int. Cl.
*B23P 21/00* (2006.01)
*G01T 1/20* (2006.01)

(52) U.S. Cl.
CPC .................................... *G01T 1/2018* (2013.01)
USPC ................ 29/469; 29/417; 29/428; 29/592.1; 29/595; 250/487.1; 250/483.1; 250/368; 427/157; 427/162; 428/313.9; 428/339

(58) Field of Classification Search
USPC ......................... 29/417, 428, 469, 592.1, 595; 250/361 R, 368, 487.1, 483.1; 427/157, 427/162; 428/313.9, 339
See application file for complete search history.

(56) References Cited

U.S. PATENT DOCUMENTS 8,669,528 B2 *   3/2014   Itaya et al. ..................... 250/368
8,803,098 B2 *   8/2014   Arimoto et al. ........... 250/361 R
(Continued)

FOREIGN PATENT DOCUMENTS

| JP | 2000-009845 | 1/2000 |
|---|---|---|
| JP | 2002-116258 | 4/2002 |
| JP | 2002-243859 | 8/2002 |
| JP | 2003279654 | 10/2003 |

(Continued)

OTHER PUBLICATIONS

Japanese Office Action, Written Notice of Ground of Rejection, Patent Application TOKUGAN No. 2012-509349, Date of Drafting: Sep. 19, 2014 and English translation thereof (total of 14 pages).

*Primary Examiner* — Paul D Kim
(74) *Attorney, Agent, or Firm* — Lucas & Mercanti, LLP (57) ABSTRACT

Disclosed is a method of manufacturing a flat panel detector such that the surface on the side of a fluorescent body layer of a scintillator panel which has the fluorescent body layer comprising a column crystal on the supporting body, is coupled to the planar light receiving element surface of a light-receiving element, comprising: a step of manufacturing the scintillator panel which has a larger area than that of the planar light receiving element surface; a step of trimming the edges of the scintillator panel, obtained by the step of manufacturing the scintillator panel, to correspond to the area of the planar light receiving element surface; and a step of coupling the edge-trimmed scintillator panel to the planar light receiving element surface, thus providing a flat panel detector which has an excellent productivity and that can be made small in size without non-image area.

28 Claims, 5 Drawing Sheets

(56) References Cited

U.S. PATENT DOCUMENTS

| | | | |
|---|---|---|---|
| 2008/0111083 A1* | 5/2008 | Kondo et al. | 250/370.11 |
| 2010/0314547 A1* | 12/2010 | Kudo et al. | 250/368 |
| 2012/0211669 A1* | 8/2012 | Itaya et al. | 250/458.1 |
| 2013/0068953 A1* | 3/2013 | Itaya et al. | 250/368 |

FOREIGN PATENT DOCUMENTS

| | | |
|---|---|---|
| JP | 2005-308582 | 11/2005 |
| JP | 2008-213043 | 9/2008 |
| JP | 2008-224422 | 9/2008 |
| JP | 2009-068888 | 4/2009 |

* cited by examiner

METHOD OF MANUFACTURING FLAT PANEL DETECTOR

CROSS REFERENCE TO RELATED APPLICATION

This Application is a 371 of PCT/JP2011/054295 filed on Feb. 25, 2011 which, in turn, claimed the priority of Japanese Patent Application No 2010-088512 filed on Apr. 7, 2010, both applications are incorporated by reference herein.

TECHNICAL FIELD

The present invention relates to a method of manufacturing a flat panel detector provided with a scintillator panel, in particular, to a method for manufacturing a miniaturized flat panel detector.

TECHNICAL BACKGROUND

Hitherto, radiation images, such as X-ray images have been widely used for diagnosis of disease conditions in the medical site. In particular, since, radiation images produced by a combination, system of an intensifying screen and an X-ray film have high sensibility and high quality, such a combination system has been, used as a common imaging system in a medical site for a long time.

However, information by these radiation images is so-called analog image information, and cannot be applied to free image processing or instant electrical transmission as with digital image information which has been developed in recent years.

For this reason, in recent years, digital type image detecting devices represented by computed radiography (CR), flat, panel type radiation detector (FPD), and the like have been employed.

The digital type X-ray image detecting devices include a direct type and an indirect type.

As the direct type, for example, X-ray image detecting devices employing solid-state imaging elements (CCD, CMOS, etc.) are known, and as the application, these devices are used for industrial non-destructive inspection and dental radiography in which they are inserted in mouths so as to take still images in the mouths.

The above devices have been developed specifically in the dental diagnosis application remarkably. For example, a small device for use in a mouth has been used in a panoramic photography and Cephalo-graphy in place of film.

In the indirect type, a scintillator panel including a phosphor layer containing a phosphor is used to convert once X rays into visible light, the visible light is converted into electrical charge signals by a flat light receiving element including photodiode, CCD, CMOS and the like, and the electrical charge signals are led to a charge accumulation capacitor.

As compared with the direct type, since the indirect type is simple and has a high sensitivity, it has been used in the wide application.

As a phosphor layer used for the indirect type scintillator panel, phosphor layers containing phosphors which include alkali halides, such as CsBr and CsI, as a base material and are activated with. Eu, Tl, etc. may be used in many cases, because they shows high brightness and high sharpness. Among the X-ray image detecting devices, a flat radiation image sensing device (hereafter, referred to a flat panel detector, or simply referred to FPD) provided with a scintillator panel having a phosphor layer formed by gas phase methods, such as evaporation has been used suitably.

The scintillator panels provided with a phosphor layer formed by gas phase methods, such as evaporation, have the above advantages. However, in the case where the phosphor layer is formed by, for example, evaporation by use of a common substrate, it may be difficult to cut out fee phosphor layer after the evaporation. Accordingly, in order to manufacture a FPD, it is obliged to use a substrate with a size corresponding to the size of the FPD to be manufacture and to form a phosphor layer on the substrate.

In that case, there is a problem that a region (image formation impossible region) incapable of being used for an image formation occurs in a peripheral edge portion of a scintillator panel due to unevenness at the time of evaporation.

On the other hand, in recent years, with the enlargement of an application range of FPD, requests to make a FPD thinner and to enlarge an area of a scintillator contributing image formation increase.

Namely, with the popularization of a small size detector configured to be inserted in a mouth so as to photograph in the mouth in the field of dentistry, smaller and thinner detectors are requested. At the same time, in the smaller and thinner detectors, in order to increase an imaging area in the used area of a FPD, it is requested to reduce an area which, occurs in a peripheral portion of a scintillator panel and cannot be used for image formation.

From the viewpoint of effective utilization of property, such as a photographing stage, a photographing bed, and the like which are widely employed in medical facilities for use in a combination system of an intensifying screen and an X-ray film, a flat panel detector is requested to be made in a cassette size in the combination system of an intensifying screen and an X-ray film. In addition, from the above viewpoint, it is request to make a FPD thinner and to increase an image forming area of a scintillator.

In order to solve the problem of this region incapable of forming images, for example, in the pamphlet of International Publication No. 04/079396, a method of attaching a substrate to an auxiliary base board beforehand is proposed. However, since it is necessary to prepare a substrate of a required size before vapor deposition and to cover the substrate together with the auxiliary base board with an organic film, the method lacks efficiency.

Further, in a known method, a scintillator panel is prepared by forming a phosphor layer on a substrate made of a polymeric material via a deposition method and cut out via a specific cutting method (refer to Patent Document 1). However, the simple application of this known method is insufficient for the above requests.

On the oilier hand, since the CsI-based scintillator (phosphor layer) has a deliquescent property, it has a defect that the characteristic deteriorates over time. In order to prevent fee deterioration over time, it is proposed to form a moisture-proof protective layer on the surface of the CsI-based scintillator (phosphor layer).

Then, for example, in another known method, the top and side surfaces of a scintillator layer (phosphor layer) and the scintillator layer outer peripheral portion of a substrate are covered with a poly-paraxylylene resin (for example, refer to Patent Document 2). Further, in another known method, at least a surface of a scintillator layer opposite to a side facing to a substrate and a side surface are covered with a transparent resin film with a moisture transmission rate less than 1.2 g/m$^2$·day (for example, refer to Patent Document 3). With these protective layers, a high vapor-proof property can be attained.

Furthermore, in order to couple a scintillator panel to a surface of a flat light-receiving element, the scintillator panel is needed to be brought, in pressure contact with the light-receiving element with a proper pressure. Then, in another known method, a cushion member is disposed between a protective layer and the scintillator panel.

That is, at the time of fabrication of a flat panel detector, a scintillator panel and a cushion member are stacked sequentially on a light receiving element disposed in a housing body, and thereafter, a protective layer is secured in the housing body, thereby fabricating the detector.

However, in this case, it is necessary to keep balance against the following problems.

For example, in the case where the moisture proof property of a detector housing body is insufficient, a high moisture proof property is required for a moisture proof protective layer on the surface of a scintillator (phosphor layer). In the case where the pressure of a cushion member is too strong, the tip portions of phosphor crystals in a columnar crystal configuration are made to collapse, and the contrast of a radiation image decreases. In contrast, in the case where the pressure of a cushion member is weak, when a FPD is oriented downward, or due to vibration, a positional deviation takes place between the surface of a scintillator panel and the surface of a flat light-receiving element. As a result, signal correction accuracy in each pixel of the flat light-receiving element decreases and the granularity and sharpness of the obtained image deteriorate.

Further, there is also a problem that defects tend to easily occur on a flat light-receiving element or a phosphor layer due to friction, between a scintillator panel and a flat light-receiving element caused by movement and vibration of a FPD device.

In order to solve above problems, a method of fixing a scintillator panel and a flat light-receiving element with an adhesive agent (for example, refer to Patent Document 4), a method of pasting them with a matching oil (for example, refer to Patent Document 5) and the like are proposed.

However, in order to secure a moisture proof property since the thickness of an adhesive agent is also added to a thick protective layer for, there is a problem that sharpness deteriorates.

In order to avoid this problem, a method of forming scintillator directly on an image sensor by deposition, and a method of using a medical intensifying screen, which has flexibility regardless of low sharpness, as substitution are conducted generally. Further, Japanese Unexamined Patent Publication No. 2008-107279 Official Report discloses an example that the shape of a scintillator panel is made to conform to the shape of the surface of a flat light-receiving element by forming a scintillator on a flexible resin substrate by vapor deposition so as to obtain uniform sharpness on all over the tight receiving surface of a flat panel detector.

However, these methods are also insufficient for the above requests to make the flat panel detector thinner and to reduce a non-imaging region on peripheral portions of a scintillator plate.

RELATED ART DOCUMENTS

Patent Documents

Patent Document 1: Japanese Unexamined Patent Publication No. 2008-213043 Official Report
Patent Document 2: Japanese Unexamined Patent Publication No. 2002-116258 Official Report
Patent Document 3: Japanese Unexamined Patent Publication No. 2005-308582 Official Report
Patent Document 4: Japanese Unexamined Patent Publication No. 2002-243859 Official Report
Patent Document 5: Japanese Unexamined Patent Publication No. 2000-9845 Official Report

DISCLOSURE OF THE INVENTION

Problems to be Solved by the Invention

An object of the present invention is to provide a flat panel detector manufacturing method for manufacturing a flat panel detector which excels in productivity, has not a non-imaging region, and is small.

Furthermore, another object of the present invention is to provide a flat panel detector manufacturing method for manufacturing a flat panel detector which excels in productivity, has very few non-imaging regions, is small and thin while keeping a good image quality.

Means for Solving the Problems

The above-mentioned objects of the present invention can be attained by the following methods.

1. A flat panel detector manufacturing method for manufacturing a flat panel detector that includes a flat light-receiving element which has a plurality of pixels arranged in a two dimensional form and a scintillator panel which has a substrate and a phosphor layer composed of columnar crystals formed on the substrate, wherein a phosphor layer side surface of the scintillator panel is made coupling to a surface of the flat light-receiving element; the flat panel detector manufacturing method is characterized by comprising: a scintillator panel producing process which produces a scintillator panel, with an area larger than that of a surface of the flat light-receiving element; a cutting process which arts out the scintillator panel obtained by the scintillator panel producing process in response to the area of the surface, of the flat light-receiving element; and a process of coupling a cut-out scintillator panel to the surface of the flat light-receiving element.

2. The flat panel detector manufacturing method described in the 1 is characterized by further comprising a protective layer forming process of forming a protective layer on the phosphor layer before the cutting process.

3. The flat panel detector manufacturing method described in the 1 or 2 is characterized in that the protective layer is a resin, and the resin is made to adhere to the phosphor layer.

4. The flat panel detector manufacturing method described in the 3 is characterized in that the resin is poly paraxylylene or a hot-melt resin.

5. The flat panel detector manufacturing method described in any one of the 1 to 4 is characterized in that the substrate contains carbon, aluminium, or glass as a main composition.

6. The flat panel detector manufacturing method described in the 5 is characterized, in that the substrate has a thickness of 0.3 mm or more and 1.0 mm or less.

7. The flat panel detector manufacturing method described in the 5 or 6 is characterized in that the phosphor layer has a thickness of 0.8 mm or less.

8. The flat panel detector manufacturing method described in any one of the 1 to 4 is characterized in that the substrate is made of resin.

9. The flat panel detector manufacturing method described in the 6 is characterized in that the resin contains at least one of polyimide (PI) and polyethylenenaphthalate (PEN).

10. The flat panel detector manufacturing method described in the 8 or 9 is characterized in that the substrate has a thickness of 0.05 mm or more and 0.2 mm or less.

11. The flat panel detector manufacturing method described in any one of the 8 to 10 is characterised in that the phosphor layer has a thickness of 0.6 mm or less.

12. The flat panel detector manufacturing method described in any one of the 1 to 11 is characterized in that the cutting process is a dicing process.

13. The flat panel detector manufacturing method described in any one of the 8 to 11 is characterized in that the cutting process achieves cutting by laser, punching with a punching die, or a cutting blade.

14. A flat panel detector manufacturing method for manufacturing a flat panel detector that, includes a flat light-receiving element which has a plurality of pixels arranged hi a two dimensional form and a scintillator panel which has a phosphor layer composed of columnar crystals and a protective layer formed in this order on a substrate, wherein the scintillator panel is made coupling to a surface of the flat light-receiving element; the flat panel detector manufacturing method is characterized by comprising: a scintillator panel producing process which produces a scintillator panel with an area larger than that of a surface of the flat light-receiving element; a cutting process which cuts out the scintillator panel obtained by the scintillator panel producing process in response to the area of the surface of the flat light-receiving element; a process of coupling a cut-out scintillator panel to the surface of the flat light-receiving element, and a protective layer forming process of forming a protective layer on the phosphor layer after the cutting process.

15. The flat panel detector manufacturing method described in the 14 is characterized in mat the protective layer is a resin, and the resin is made to adhere to the phosphor layer.

16. The flat, panel detector manufacturing method described in the 15 is characterized in that the resin is poly paraxylylene or a hot-melt resin.

17. The flat panel detector manufacturing method described, in any one of the 14 to 16 is characterized in that the substrate contains carbon, aluminum, or glass as a main composition.

18. The flat panel detector manufacturing method described in the 17 is characterized in that the substrate has a thickness of 0.3 mm or more and 1.0 mm or less.

19. The flat panel detector manufacturing method described in the 17 or 18 is characterized in that the phosphor layer has a thickness of 0.8 mm or less.

20. The flat panel detector manufacturing method described in any one of the 14 to 16 is characterized in that the substrate is made of resin.

21. The flat panel detector manufacturing method described in the 20 is characterized in that the resin contains at least one of polyimide (PI) and polyethylenenaphthalate (PEN).

22. The flat panel detector manufacturing method described in the 20 or 21 is characterized in that the substrate has a thickness of 0.05 mm or more and 0.2 mm or less.

23. The flat panel detector manufacturing method described in any one of the 20 to 22 is characterized in that the phosphor layer has a thickness of 0.6 mm or less.

24. The flat panel detector manufacturing method described in any one of the 14 to 23 is characterized in that the cutting process is a dicing process.

25. The flat panel detector manufacturing method described in any one of the 14 to 23 is characterized in that the cutting process achieves cutting by laser, punching with a punching die, or a cutting blade.

26. A flat panel detector manufacturing method for manufacturing a flat panel detector that includes a flat light-receiving element which has a plurality of pixels arranged in a two dimensional form and a scintillator panel which has a substrate and a phosphor layer composed of columnar crystals formed on the substrate, wherein a phosphor layer side surface of the scintillator panel is made coupling to a surface of the flat light-receiving element and radiation is irradiated from the light receiving element side; the flat panel detector manufacturing method is characterized by comprising: a scintillator panel producing process which produces a scintillator panel with an area larger than that of a surface of fee flat light-receiving element; a cutting process which cuts out the scintillator panel obtained by the scintillator panel producing process in response to the area of the surface of the flat light-receiving element; and a process of coupling a cut-out scintillator panel to the surface of the flat light-receiving element.

27. The flat panel detector manufacturing method described in the 26 is characterized in that the substrate contains carbon, aluminium, or glass as a main composition.

28. The flat panel detector manufacturing method described in the 27 is characterized in that the substrate has a thickness of 0.5 mm or more and 1.0 mm or less.

Effects of the Invention

With the above method, it is possible to provide a flat panel detector manufacturing method for manufacturing a flat panel detector which excels in productivity, has not a non-imaging region, and is small.

Further, it is possible to provide a Hat panel detector manufacturing method for manufacturing a flat panel detector which excels in productivity, has very few non-imaging regions, is small and thin while keeping a good image quality.

EMBODIMENT FOR CARRYING OUT THE INVENTION

The present invention is directed to a flat panel detector manufacturing method for manufacturing a flat panel detector that includes a flat light-receiving element which has a plurality of pixels arranged in a two dimensional form and a scintillator panel which has a substrate and a phosphor layer composed of columnar crystals on the substrate, wherein the phosphor layer side surface of the scintillator panel is made coupling to the surface of the flat light-receiving element; wherein the flat panel detector manufacturing method includes: a scintillator panel producing process which produces a scintillator panel with an area larger than, that of the surface of the flat light-receiving element; a cutting process which cuts out the scintillator panel obtained by the scintillator panel producing process in response to the area, of the surface of the flat light-receiving element; and a process of coupling the cut-out scintillator panel to the surface of the flat light-receiving element.

In the present invention, the formation of a protective layer so as to adhere to the phosphor layer after the formation of the phosphor layer and before the cutting enables to obtain a small flat panel detector not provided, with a non-imaging region.

(Constitution of a Flat Panel Detector)

Figure 1:
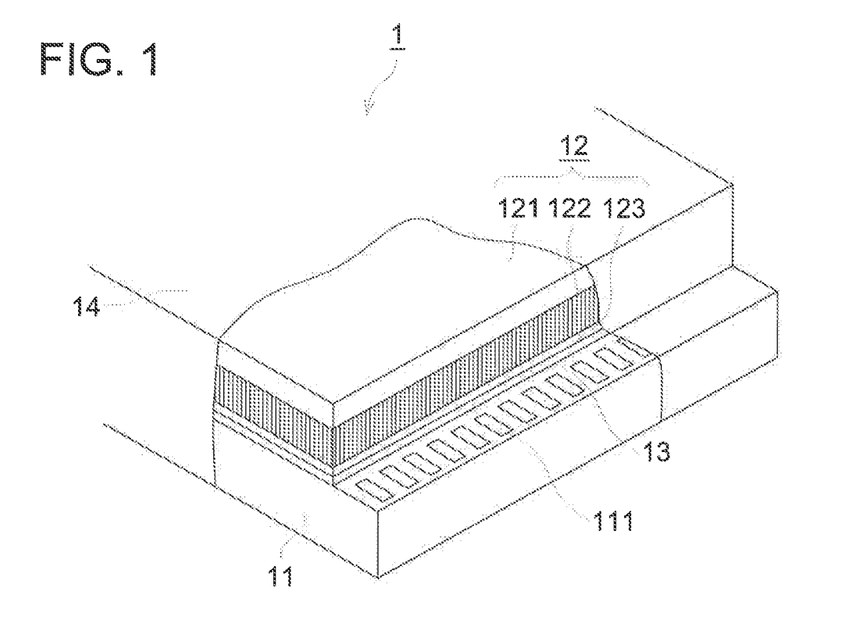
FIG. 1 is a schematic cross sectional view showing one example of a constitution of a flat panel detector.

The constitution of a flat panel detector according to the present invention will be explained with reference to FIGS. 1 and 2. Each constitutional element will be mentioned later, FIG. 1 is a cross sectional view showing an example of the constitution of a flat panel detector.

The scintillator panel 12 is pasted on a CMOS type light receiving element 11 via an adhesive layer 13. The substrate 121 of the scintillator panel 12 is made the same size with that of a phosphor layer 122. The whole surface of a light receiving pixel section except a signal take-out section 111 of the light receiving element 11 and a phosphor layer 122 parts of the scintillator panel 12 are made coupling to each other. The entire body of the flat-panel-detector 1 is sealed with a case 14 composed of resin with low moisture permeability.

Figure 2:
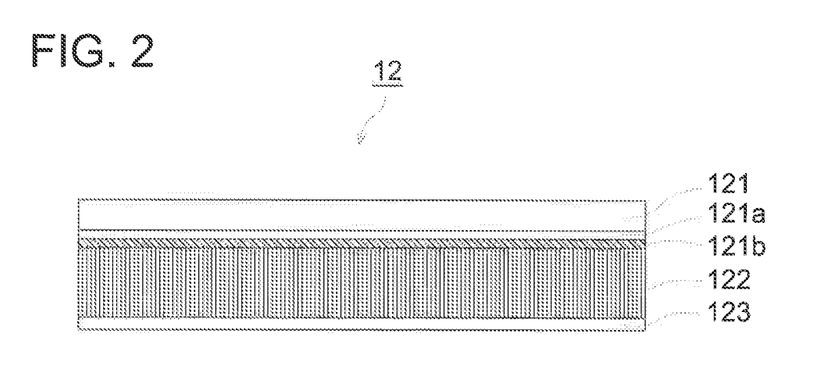
FIG. 2 is a schematic cross sectional view showing one example of a constitution of a scintillator panel

FIG. 2 is a cross sectional view of the scintillator panel 12 in which a substrate 121, a reflecting layer 121a, undercoating layer 121b, a phosphor layer 122, and a protective layer 123 are formed in this order. The protective layer 123 does not exist in the cross sectional surface of the phosphor layer 122.

(Method for Manufacturing a Flat Panel Detector)

A method for manufacturing a flat panel detector according to the present invention (hereafter, also merely referred to as a manufacturing method according to the present invention) includes a scintillator panel producing process which produces a scintillator panel with an area larger than that of a surface of a flat light-receiving element; a cutting process which cats out the scintillator panel obtained by the scintillator panel producing process in response to the area of the surface of the flat light-receiving element; and a process of coupling the cut-out scintillator panel to the surface of the flat light-receiving element. The detail of each process will be described later.

In the present invention, at the time of production of the scintillator panel with a size required to form a single flat panel detector, a scintillator panel with an area larger than that of a surface of a flat light-receiving element is produced, the scintillator panel is cut out, and the cut-out scintillator panel is used. Accordingly, a portion which comes into existence at the process of producing the scintillator panel and becomes a non-imaging region on a peripheral portion is not used, whereby a small flat panel detector not provided with a non-imaging region can be obtained.

In the present invention, especially, in the case where the manufacturing method includes a protective layer forming process to form a protective layer on the phosphor layer before the cutting process, the cutting can be conducted more efficiently without damaging the phosphor layer in the cutting process.

The inclusion of the protective layer forming process is effective especially in the ease of use of rigid substrates, such as carbon, aluminum, or glass. The formation of a protective layer so as to adhere to the surface of a phosphor layer, a blade dicing to cut the scintillator panel info a prescribed size can be performed without causing crystal crack. The blade dicing is a cutting technique which employs a blade generally used for dicing a silicon wafer and the like.

(Scintillator Panel)
(Constitution of a Scintillator Panel)

Although the scintillator panel according to the present invention includes a phosphor layer composed of columnar crystals on a substrate, a preferable embodiment further includes an undercoating layer between the substrate and the phosphor layer. Further, the scintillator panel may be constituted so as to provide a reflecting layer on the substrate and to laminate the reflecting layer, the undercoating layer and the phosphor layer.

Hereafter, each constitutional layer and constitutional element will be described.

(Phosphor Layer)

The phosphor layer according to the present invention is composed of columnar crystals of phosphors.

A material to form a phosphor layer may employ a variety of commonly known phosphor materials, of which cesium iodide (CsI) is preferred since it exhibits an enhanced conversion rate of X-rays to visible light and readily forms a columnar crystal structure of a phosphor, whereby scattering of emitted light within the crystal is inhibited through the light guide effect, rendering it feasible to increase the scintillator layer thickness.

However, CsI exhibits by itself a relatively low emission efficiency so that various activators are incorporated. For example, JP-B No. 54-35060 disclosed a mixture of CsI and sodium iodide (NaI) at any mixing ratio. Further, JP-A No. 2001-59899 disclosed vapor deposition of CsI containing an activator, such as thallium (H), europium (Eu), indium (In), lithium (Li), potassium (K), rubidium (Ru) or sodium (Na). In the present invention, thallium (TV) or europium (Eu) is preferred, of which thallium (Tl) is more preferred.

Further, it is preferred to employ, as raw materials, an additive attaining at least one thallium compound and cesium iodide. Thus, thallium-activated cesium iodide (denoted as CsI:Tl), which exhibits a broad emission wavelength of from 400 to 750 nm, is preferred.

There can be employed various thallium compounds (compound having an oxidation number of +I or +III) as a thallium compound contained in such an additive.

Preferred examples of thallium compounds include thallium bromide (TlBr), thallium chloride (TlCl), and thallium fluoride (TlF, $TlF_3$).

The melting point of a thallium compound relating to the present invention is preferably in the range of 400 to 700° C. In the present invention, the melting point is one under ordinary temperature and ordinary pressure.

In the phosphor layer of the present invention, the content of an additive, as described above is desirably optimized in accordance with its object or performance but is preferably from 0.001 to 50.0 mol % of the content of cesium iodide, and more preferably from 0.1 to 10.0 mol %, from the viewpoint of holding of luminescence brightness and the characteristic and function of cesium iodide.

It is desirable that the thickness of a phosphor layer is 50 to 600 μm, and in the case where a resin film is used as a substrate, it is desirable that the thickness is 50 to 500 μm from the viewpoint of the damage of the phosphor at the time of cutting. Further, in view of the balance in characteristic between brightness and sharpness, it is more desirable for the medical application that the thickness is 120 to 400 μm.

(Reflecting Layer)

It is preferable to dispose a reflecting layer on a substrate. A reflecting layer is used to reflect light emitted from a scintillator so as to enhance a light extraction efficiency. The reflecting layer is preferably formed by a material containing at least one element selected from Al, Ag, Cr, Cu, Ni, Ti, Mg, Rh, Pt, and Au. It is specifically preferred to use a metal thin-film composed of the foregoing elements, for example, Ag film and Al film. If is also preferred to form two or more metal thin-films, in this connection, the thickness of the reflecting layer is 0.005 to 0.3 µm, and more preferably 0.01 to 0.2 µm from fee viewpoint of a light emission extraction efficiency.

(Undercoating Layer)

In the present invention, it is desirable to dispose an underrating layer between a substrate and a phosphor layer or between a reflecting layer and a phosphor layer. The undercoating layer may be formed by a method for forming a poly paraxylylene film via a CVD method (vapor phase chemical growth method) or a method by a polymer binder material (binder). However, from the viewpoint of film adhesion, a method by a polymer binder material (binder) is more preferable. Further, the thickness of the undercoating layer is preferably 0.5 to 4 µm from the viewpoints of sharpness, prevention performance of occurrence, of turbulence in columnar crystal and the like.

The undercoating layer is formed preferably by coating a polymer binder material (hereinafter, also denoted simply as a binder) dissolved or dispersed in a solvent, followed by drying. Specific examples of fee polymer binder material include a polyurethane, a vinyl chloride copolymer, a vinyl chloride/vinyl acetate copolymer, a vinyl chloride/vinylidene chloride copolymer, a vinyl chloride/acrylonitrile copolymer, butadiene/acrylonitrile copolymer, a polyamide resin, polyvinyl butyral, a polyester, a cellulose derivative (e.g., nitrocellulose), a styrene-butadiene copolymer, various kinds of synthetic rubbers, a phenol resin, an epoxy resin, a urea resin, a melamine resin, a phenoxy resin, a silicone resin, an acryl resin and a urea-formamide resin. Of these, a polyurethane, a polyester, a vinyl chloride copolymer, a polyvinyl butyral and a nitrocellulose are preferred.

A polyurethane, a polyester, a vinyl chloride copolymer, a polyvinyl butyral, and a nitrocellulose are preferred as the polymer binder material specifically in terms of adhesion to the phosphor layer. A polymer having a glass transition temperature (Tg) of 30 to 100° C. is also preferred in terms of adhesion to deposition crystals and a substrate. In view of these, a polyester resin is specifically preferred.

Specific examples of a solvent used for preparation of a undercoating layer include a lower alcohol such as methanol, ethanol, n-propanol or n-butanol, a chlorine-containing hydrocarbon such as methylene chloride or ethylene chloride, a ketone such as acetone, methyl ethyl ketone or methyl isobutyl ketone; an aromatic compound such as toluene or benzene or xylene, cyclohexane, cyclohexanone; an ester of a lower carboxylic acid and a lower alcohol such as methyl acetate, ethyl acetate or butyl acetate; dioxane, an ether such as ethylene glycol monoethyl ether or ethylene glycol monomethyl ether; and their mixtures.

Further, the undercoating layer may contain a pigment or a dye in order to prevent scattering of light emitted from a phosphor (scintillator) and to enhance sharpness.

(Protective Layer)

In the present invention, it is desirable to include a process for forming a protective layer on a phosphor layer before a cutting process.

The protective layer relating to the present invention is a layer for improving more a damage prevention performance to prevent damage such as crystal cracks of columnar crystals of the phosphor layer at the time of cutting in a cutting process.

This protective layer may have functions such as moisture proof in a period until a scintillator panel is set in a detector casing and corrosion prevention for corrosion of a light receiving element side due to contact between a scintillator and a light receiving element.

That is, in order to exhibit such functions, in a period until a scintillator panel is made coupling to a flat light-receiving element, in the case where the scintillator panel is managed under the environment of low humidity, it may be enough for the protective layer to merely exist in a surface portion being in contact with a light receiving element, and it is not necessary to cover the cutting surface side of a phosphor layer. In this case, it is desirable that fee casing of a flat panel detector is made of a material with moisture permeability lower than that of the protective layer.

For example, in a small size detector configured to be put in a mouth and to photograph the inside of the mouth in a dental field, the entire body of the housing is needed to be washed with water or subjected to alcoholic disinfection. Accordingly, the housing itself has high moisture proof properties.

The protective layer may be formed by use of various materials. However, in a desirable embodiment, the protective layer is made of resin. In the protective layer, the resin is preferable to adhere to the phosphor layer.

Specific examples of the resin and methods for making adhesion may preferable include the followings.

For example, a poly paraxylylene film is formed by a CVD method. That is, a poly paraxylylene film is formed on the entire surface of a phosphor (scintillator) and a substrate, and used as a protective layer.

The thickness of a poly paraxylylene film is preferably 2 µm or more and 10 µm or less. In the case where a protective layer is pasted to a light receiving element by use of an adhesive agent, the thickness of the adhesive layer is preferably 10 µm or more and 18 µm or less from the viewpoints of securing of an adhesion force and sharpness.

Further, as a protective layer in another embodiment, a hot-melt resin may be also used on a phosphor layer. The hot-melt resin, may serve also as adhesion between a scintillator panel and the surface of a flat light-receiving element. Preferable examples of the main component of the hot-melt resin include, without being limited thereto, a polyolefine type, polyester type, or polyamide type resin. The thickness of the hot-melt resin is preferably 20 µm or less.

In the present invention, the hot-melt, resin means an adhesive resin winch does not contain water or a solvent, is a solid at a room temperature, and is composed of a thermoplastic material of nonvolatility. When the resin temperature rises, the hot-melt resin melts and when the resin temperature lowers, it becomes solidified. Further, when being heated, the hot-melt resin becomes a melting state and has adhesive properties, and at room temperature, the hot-melt resin becomes a solid state and has not adhesive properties. From the viewpoint, of light permeability, polyolefin type resin is more desirable.

Further, the melt starting temperature of the hot-melt resin is preferably 60° C. or more and 150° C. or less from the viewpoints of continuous use characteristics on a flat light-receiving element such as TFT and prevention properties for peeling of adhesion. The melt starting temperature of the hot-melt resin may be adjusted by addition of plasticizer.

Examples of the methods for producing a protective layer by a hot-melt resin, include methods shown below. A peeling seat coated with a peeling agent is prepared and a hot-melt resin is coated on this peeling seat. Then, the surface of the hot-melt resin is disposed on the surface of a phosphor layer of a scintillator panel, and pasted on the surface by being pressed with a heated roller. Subsequently, after cooling, the peeling seat is removed.

Alternatively, in another method, after the surface of the hot-melt resin of the peeling seat is disposal on the surface of a phosphor layer of a scintillator panel, resin films are arranged above and below a lamination of the peeling seat and the scintillator panel, and peripheral portions of these resin films are sealed so as to enclose the lamination. Subsequently, the enclosed lamination is heated under an atmospheric pressure.

As the resin films in the subsequently-mentioned method, a sealant film and a dry laminate film, of polyethylene terephthalate (PET) are suitable. The subsequently-mentioned method is more preferable, because an uniform adhesion pressure by an atmospheric pressure is obtained on the whole phosphor layer surface.

Moreover, the light permeability of the protective layer is preferably 70% or more for a wavelength of 550 nm in consideration of photoelectric conversion efficiency, the emission wavelength of a phosphor (scintillator), and the like.

(Substrate)

The scintillator panel relating to she present invention may include a substrate made of at least one of various kinds of materials, and example of the substrates include a substrate made of a material which contains carbon, aluminium, or glass as a main composition, and a substrate made of resin.

In the case where a substrate contains carbon, aluminium, or glass as a main composition, a blade dicing may be employable in the cutting process as mentioned above. Specifically, in the case where a protective layer is disposed, the scintillator panel can be cut out in a prescribed size without causing cracks in crystals, thereby performing cutting more preferably.

Further, from the viewpoints of reduction of motional heat at the time of cutting, the thickness of the substrate is preferably 1.0 mm or less. Furthermore, from the viewpoints of handling facility and easiness in procurement, the thickness is more preferably 0.3 mm or more.

Especially, in the blade dicing for a scintillator panel with deliquescent properties, it may be difficult to use cooling water. Accordingly, instead of it, it may be preferable to use cooling air.

In addition, in this case, in a preferable embodiment of the present invention, the thickness of a phosphor layer is made 0.8 mm or less, thereby preventing cracks in crystals at the time of cutting.

Moreover, in the case where the substrate is made of glass, a laser dicing can also be used. The laser dicing is a cutting method which utilizes an optical breakage phenomenon generated in the case where the focus of a laser light beam is set inside a process target object so as to increase extremely the intensity of the laser light beam called multi photon absorption. In the laser dicing, a modifying layer is formed inside the glass, end the glass is divided from the modifying layer serving as an origin. In recent years, the laser dicing is beginning to be used for cutting of a silicon wafer.

Examples of the substrates composed of resin include resin films (plastic film), such as a cellulose acetate film, a polyester film, a polyethylene terephthalate (PET) film, a polyethylenenaphthalate (PEN) film, a polyamide film, a polyimide (PI) film, a triacetate film, a polycarbonate film, and a carbon fiber-reinforced resin seat.

Among the above films, specifically, in the case where phosphor columnar crystals are formed from raw materials of cesium iodide by a gas phase method, it may be preferable to use resin films containing polyimide or polyethylenenaphthalate.

The resin film as the substrate relating to the present invention has preferably a thickness of 50 to 250 μm, more preferably a thickness of 50 to 200 μm, and further has preferably flexibility.

Herein, "substrate having flexibility" means a substrate having an elastic modulus (E120) of 1000 to 6000 Ns/mm$^2$ at 120° C., and preferable examples of such a substrate include a resin film containing polyimide or polyethylene naphthalate.

The elastic modulus is determined such that a tension testing machine is used to define a region indicating a rectilinear relationship between strain shown by the marked line of a sample based on JIS C 2318 and stress corresponding to the strain and the inclination of the stress relative to an amount of strain is obtained. The obtained value is called "Young's modulus". Herein, the Young's modulus is defined as "elastic modulus".

In the case where the substrate used for the present invention is resin, as mentioned above, the elastic modulus (E120) at 120° C. is preferably 1000 to 6000 Ns/mm$^2$, and more preferably 1200 to 5000 Ns/mm$^2$.

Specific examples of resin for a resin film include polyethylene naphthalate (E120=4100 N/mm$^2$), polyethylene terephthalate (E120=1500 N/mm), a polybutylene naphthalate (E120=1600 N/mm$^2$), polycarbonate (E120=1700 N/mm$^2$), syndiotactic polystyrene (E120=2200 N/mm$^2$), polyetherimide (E120=1900 N/mm$^2$), polyimide (E120=1200 N/mm$^2$), polyarylate (E120=1700 N/mm$^2$), polysulfone (E120=1800 N/mm$^2$), and polyether sulfone (E120=1700 N/mm$^2$).

These resins may be used independently, laminated or mixed in combination. Especially, as an especially preferable resin film, as mentioned above, a resin film containing polyimide or polyethylene naphthalate may be preferable.

At the time of pasting of a scintillator panel and the surface of a flat light-receiving element by coupling, in the case where it is difficult to obtain a uniform image quality characteristic in a light receiving surface of a flat panel detector due to receipt of influences such as deformation of a substrate or warpage at the time of deposition, a substrate made of a resin film with a thickness of 50 to 500 μm allows a scintillator panel to deform to a shape conforming to the shape of the surface of a flat light-receiving element, whereby uniform sharpness can be obtained over the entire surface of the light receiving surface of the flat panel detector.

In the case where the substrate is a resin film composed of resin, its thickness is preferably 0.05 mm or more and 0.20 mm or less. In this case, in addition, the thickness of a phosphor layer made 0.6 mm or less enables cutting by a laser beam, a press-cutting die, or a cutting blade without a protective layer adhering on the surface of a phosphor layer. The above constitution is one of the preferable embodiments of the present invention.

The laser cutting used in the present invention is a method of processing a machining object by a thermal action and simultaneously disassociating molecular bonds such as a C—H bond and a C—C bond in organic materials. Accordingly, the laser cutting is different from the laser dicing configured to form a modifying layer in the inside of glass. The laser used in the present invention is preferably an ultraviolet laser beam with a wavelength of about 266 nm.

The phosphor layer is cut out due to a thermal action, and the substrate is cut out due to disassociation among molecular bonds. Accordingly, since a phosphor layer is cut out due to a thermal action and substrate is cut out due to disassociation among molecular bonds, crystal cracks at cut-out portions can be prevented more.

That is, in the case where a resin film is used as a substrate on the above-mentioned conditions, a non image region does not exist, and the thickness of a scintillator panel becomes thin. Accordingly, such a substrate becomes preferable to be applied for a detector used in a mouth and a flat panel detector of a cassette size. Furthermore, in the case where a flexible resin substrate is used, the contact between a scintillator panel and a surface of a flat light-receiving element becomes uniform over the entire surface, whereby an image characteristic can be equalized in the surface.

Moreover, in the case where the casing which constitutes a flat panel detector has high moisture proof properties as with the above detector used in a mouth, a protective layer may be omitted, or a protective layer, if employed, is enough to keep a protecting function only a period until a flat panel detector is manufactured in the coupling process, which allows the protective layer to be thinned more. Accordingly, the resulting flat panel detector can be used effectively for the application of a detector used in a mouth.

(Scintillator Panel Producing Process)

In a process of producing a scintillator panel relating to the present invention, a scintillator panel which has an area larger than that of a surface of a flat light-receiving element is produced.

The area of the scintillator panel which has an area larger than that of a surface of a flat light-receiving element may be depending on the size of a flat light-receiving element, but is preferably approximately several times or ten and several times the area of the surface of a flat light-receiving element.

In the case where the area of a surface of a flat light-receiving element is 2500 $mm^2$ or less, the scintillator panel according to the present invention is effective especially. For example, the scintillator panel according to the present invention is effectively used for a light receiving element wife the shape of a flat light-receiving element which can be accommodated in a square shape of 50 mm×50 mm.

The shape capable of being accommodated in a square shape of 50 mm×50 mm includes any shape capable of being accommodated in this square shape. In the case where the shape of a cut-out scintillator panel corresponds to this shape, the cut-out scintillator panel is specifically effective.

In the process of producing a scintillator panel, a substrate having an area larger than that of a surface of a flat light-receiving element is used, and the above-mentioned layers on the scintillator panel are formed on the substrate.

<<Formation of a Reflecting Layer>>

A metal thin film (Al film, Ag film, etc.) as a reflecting layer is formed on one surface of a substrate by a sputtering method. In the case where a resin film is used as a substrate, a film in which an Al film is vapor deposited by sputtering on a resin, film is commercially available in various kinds of products, and these products may be employed as a substrate.

<<Formation of an Undercoating Layer>>

An undercoating layer is formed by coating and drying a composition in which a polymer binder material is dispersed and dissolved in an organic solvent. As the polymer binder material, hydrophobic resins, such as polyester resin and polyurethane resin, are preferable from the viewpoints of adhesive property and the corrosion resistance of a reflecting layer, <<Formation of a Phosphor Layer>>

A phosphor layer is composed of columnar crystals, and the columnar crystals can be formed by vapor phase deposition methods, such as a deposition method. Hereafter, a typical example of the deposition method will be explained.

<Deposition Apparatus>

Figure 3:
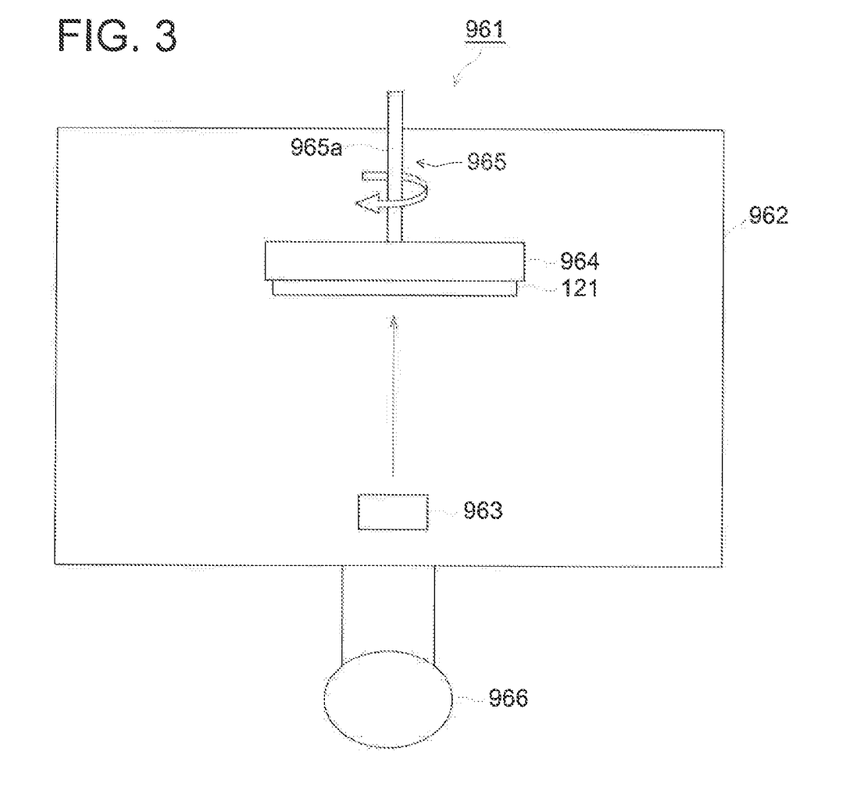
FIG. 3 is a schematic cross sectional view showing one example of a device used for forming a phosphor layer.

As shown in FIG. 3, a vapor deposition apparatus 961 has a box-shaped, vacuum container 962, and a boat 963 for vacuum deposition is disposed inside the vacuum container 962.

The boat 963 is a member to be filled with a deposition source, and an electrode is connected to the boat 963. When an electric current is made to flow into the boat 963 via the electrode, the boat 963 is configured to generate heat with Joule's heat. At the time of production of a scintillator panel for radiations, the boat 963 is filled up with a mixture containing cesium iodide and an activator compound, and when an electric current is made to flow into the boat 963, the above-mentioned mixture can be heated and evaporated.

In this connection, as a member to be filled with a deposition source, a crucible which is made from alumina and around which a heater is wound may be applied, or a heater made of metal with a high melting paint may be applied.

Inside the vacuum container 962 and right above the boat 963, a holder 64 to hold the substrate 121 is disposed. The holder is provided with a heater (not shown). Accordingly, the substrate 121 held by the holder 964 is configured to be heated by actuation of the heater. When the substrate 121 is heated, it may be possible to separate or remove an adsorbed material on the surface of the substrate 121, to prevent an impurity layer from being formed between the substrate 121 and the phosphor layer 122 formed on the surface of the substrate 121, to strengthen the adhesiveness between the substrate 121 and the phosphor layer 122 formed on the surface of the substrate 121, or to adjust the film quality of the phosphor layer 122 formed on the surface of the substrate 121.

The holder 964 is provided, with a rotating mechanism 965 to rotate the holder 964. The rotating mechanism 965 includes a rotating shaft 65a connected to the holder 64 and a motor serving as a driving source for the rotating shaft 65a When the motor is driven, the rotating shaft 65a is rotated so that the holder 964 can be rotated in a state of being opposite to the boat 963.

In the vapor deposition apparatus 961, in addition to the above constitution, a vacuum pump 966 is disposed on the vacuum container 962. The vacuum pump 966 is configured to exhaust an inside gas in the vacuum container 962 and to introduce gas into the vacuum container 962. The actuation of the vacuum pump 966 enables to maintain the inside of the vacuum container 962 under a gas atmosphere with a prescribed pressure.

Furthermore, description will be given for an example in the case of use of cesium iodide and thallium iodide.

As mentioned above, the substrate 121 provided with the reflecting layer and the undercoating layer is attached to the holder 964, and in addition, a powdered mixture of cesium iodide and thallium iodide is filled in a plurality (not shown) of boats 963 (preparation process). In this case, a distance between the boats 963 and the substrate 121 is set to 100 to 1500 mm, and then a below-mentioned deposition process is conducted while keeping a range of the setting value of the distance. More preferably, the distance between the boats 963 and the substrate 121 is set to 400 mm or more and 1500 mm or less, and deposition is achieved while heating simultaneously the plurality of boats 963.

Upon completion of processing of the preparation process, the vacuum pump 966 is actuated so as to exhaust an inner gas in the vacuum container 962, and to make the inside of the vacuum container 962 to be under a vacuum atmosphere of 0.1 Pa or less (vacuum atmosphere forming process). Herein, "under a vacuum atmosphere" means a pressure atmosphere of 100 Pa or less, and is preferably a pressure atmosphere of 0.1 Pa or less.

Next, inert gas, such as argon, is introduced into the inside of the vacuum container 962, and the inside of the vacuum container 962 is maintained under a vacuum atmosphere of 0.001 to 5 Pa, more preferably 0.01 to 2 Pa. Then, the heater of the holder 964 and the motor of the rotating mechanism 965 are activated such that the substrate 121 having been attached to the holder 964 is rotated in a state of being opposite to the boat 963 while being heated. The temperature of the substrate 121 on which a phosphor layer is formed is preferably set to a room temperature of 25 to 50° C. at the time of start of deposition, and during deposition, set to 100 to 300° C., more preferably 150 to 250° C.

On this condition, an electric current is made to flow from an electrode to a boat 963 so as to heat a mixture containing cesium iodide and thallium iodide at about 700° C. for a prescribed time period, thereby evaporating the mixture. As a result, on the surface of the substrate 121, an endless number of columnar crystals grow up one by one, thereby obtaining crystals with a desired thickness. Thereafter, the substrate on which cesium iodide is vapor-deposited is taken out, and the surface of the phosphor is cleaned with, an adherence roller.

<<Formation of a Protective Layer>>

Figure 4:
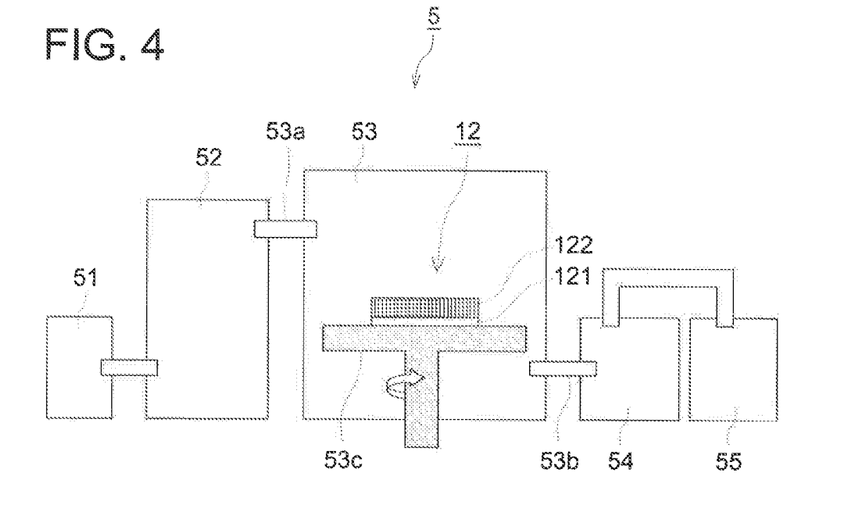
FIG. 4 is a schematic cross sectional view showing one example of a device used for forming a protective layer.

FIG. 4 is a schematic cross sectional view of one example of an apparatus used for formation of a protective layer, and in this example, a protective layer composed of a poly paraxylylene film is formed on the surface of a phosphor layer 122 of a scintillator panel 12.

A CVD deposition apparatus 5 includes a vaporizing chamber 51 which allows to dipara xylylene being a raw material of a poly paraxylylene to be inserted therein and evaporates the inserted dipara xylylene; a thermal decomposition, chamber 52 which heats and raises the temperature of the evaporated dipara xylylene so as to make it in a radical state; a deposition chamber 53 which deposits the dipara xylylene being in the radical state on a phosphor layer 122 on a substrate 121 of a scintillator; a cooling chamber 54 which performs deodorization and cooling; and an exhaust system provided with a vacuum pump. Herein, as shown in FIG. 5, the deposition chamber 53 includes a feed post 53a through which the dipara xylylene made to the radical state in the decomposition chamber 52 is fed; an exhaust port 53b through which an excessive poly paraxylylene is exhausted; and a turntable (deposition board) 53c which substrates a sample on which a poly paraxylylene film is vapor-deposited.

First, on the turntable 53c in the deposition chamber 53, a scintillator panel 12 is placed to as to make a phosphor layer 122 faced upward.

Next, dipara xylylene is heated to 175° C. and vaporized in the vaporizing chamber 51, and the vaporized dipara xylylene is further heated to raise its temperature to 690° C. and made to a radical state. Then, the dipara xylylene being in the radical state is fed (introduced) through the feed port 53a into the deposition chamber 53 and vapor-deposited to form a protective layer (poly paraxylylene film) 123 with a thickness of 3 μm on the phosphor layer 122. In this case, the inside of the deposition chamber 53 is kept under the degree of vacuum being 13 Pa. The turntable 53c is rotated at a rate of 4 rpm. Further, an excessive poly paraxylylene is discharged from the exhaust port 53b, and is led to the cooling room 54 configured to perform deodorization and cooling and to the exhaust gas system 55 provided with a vacuum pump.

Moreover, in the case where a protective layer is composed of a hot-melt resin, tor example, a hot-melt resin is coated on a peeling seat on which a peeling agent is coated. Then, the surface of the hot-melt resin is disposed on the surface of a phosphor layer of a scintillator panel, and pasted on the surface while being pressed with a roller heated to 120° C., thereby forming a protective layer. Further, in the case where an adhesive agent is used for bonding of a protective layer to the surface of a light receiving element, it is desirable to adjust the thickness of a protective layer such that the total thickness of the protective layer and an adhesive layer becomes 20 μm or less.

(Cutting Process)

In the present invention, cutting is conducted for a scintillator panel which has an area larger than the area of the surface of a used flat light-receiving element in accordance with an area according to the surface of a flat light-receiving element to be used.

In the present invention, since a scintillator panel is cut out after a phosphor layer has been formed by methods such as deposition, operations such as deposition are not needed for each flat panel detector. That is, vapor-deposition is conducted for the production-possible maximum, size capable of being produced in the deposition apparatus, and then the produced size is cut out into a desired size as required. Accordingly, this production method has a large merit in production efficiency and delivery date for shipment.

The typical example of the method used for the cutting process to cut out a scintillator panel in connection with, the present invention will be explained with reference to drawings.

Figures 5A, 5B:
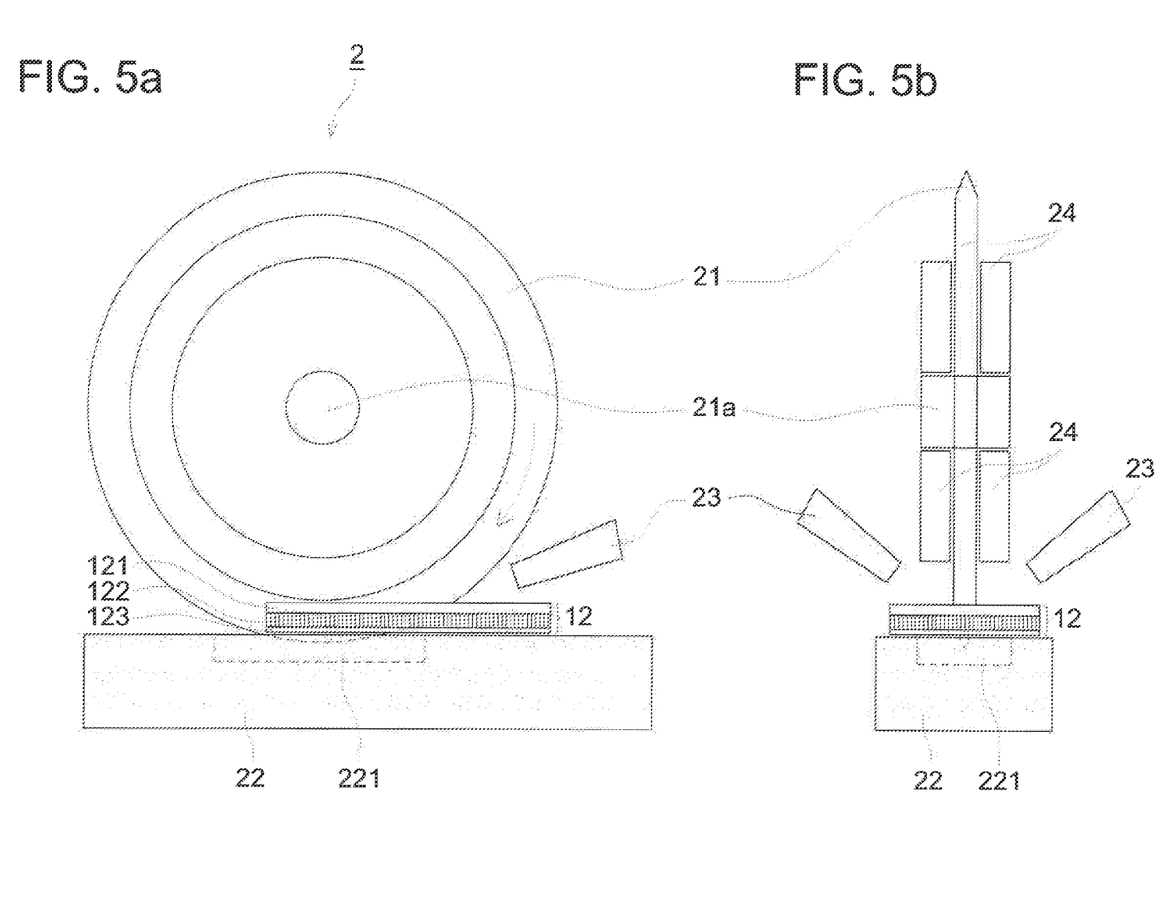
FIG. 5 is a schematic cross sectional view showing one example of a cutting device used in a cutting process.

FIG. 5(a) is a side cross sectional view, and FIG. 5(b) is a front cross sectional view. These drawings show an example of blade dicing to cut out a scintillator panel 12 after a protective layer 123 has been formed.

The scintillator panel 12 is placed on a dicing base 22 of the dicing apparatus 2 so as to make the protective layer 123 side faced downward. The scintillator panel 12 is cut out from the substrate 121 side by a blade 21. The substrate 121 is a 1 mm thick amorphous carbon.

The blade 21 is configured to cut out the scintillator panel 12 while being rotated around a rotation shaft 21a serving as a center of rotation. A groove 221 is disposed in fee dicing base 22. Further, a support member 24 is disposed at each of the both sides of the blade 21.

In order to cool frictional heat, cooling wind is sprayed from a nozzle 23 through both, sides of the blade 21 onto a cutting section. The temperature of cooling wind is set to 4° C. or less, and in order to prevent dew condensation, the humidity of the inside of the chamber is set to 20% or less.

In the case where a substrate is mainly compose of carbon, aluminium, or glass, the blade dicing can be preferably applied.

Next, an example of a laser cutting is shown.

Figure 6:
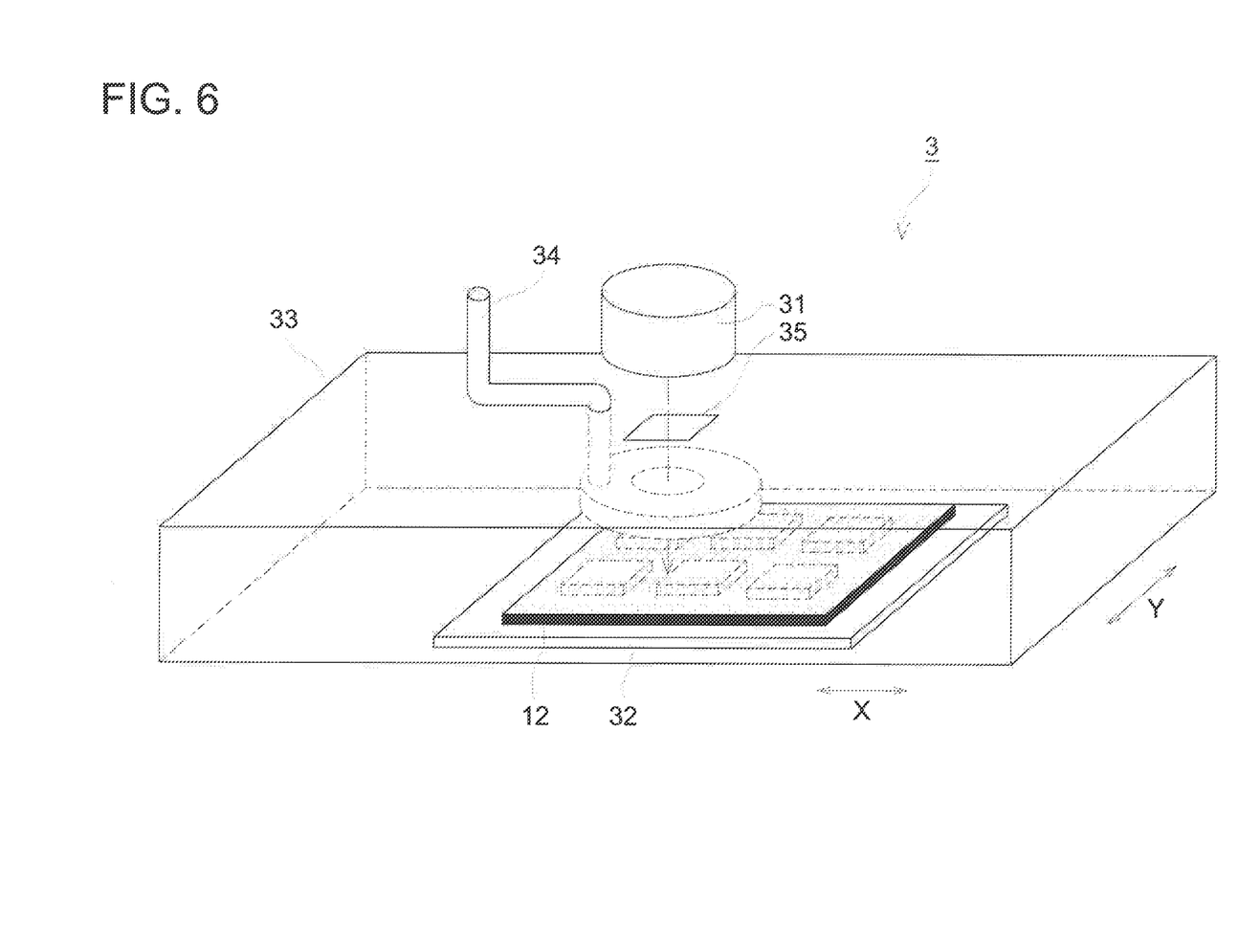
FIG. 6 is a schematic cross sectional view showing another example of a cutting device used in a cutting process.

FIG. 6 is an approximately perspective view of an apparatus used for a laser cutting, and shows an example of a laser cutting to cut out a scintillator panel 12 on which a protective layer is not formed.

A laser cutting apparatus 3 is equipped with a purge chamber 33 shaped in the form of a box. The inside of the purge chamber 33 is made in an almost enclosed space in order to prevent the invasion of dust, and the like floating in an external space. Further, the inside of the purge chamber 33 is preferably under a low humidity environment. The top surface of the purge chamber 33 is provided with a light transmissive window 35 to allow light to penetrate. Further, the purge chamber 33 is provided with a discharging pipe to lead floating matters such as dust to the outside of the purge chamber 33.

A scintillator panel 12 is placed on a supporting base 32 of the laser cutting apparatus 3 so as to make the substrate side faced downward, and then the scintillator panel 12 is adsorbed and held on the supporting base 32. Accordingly, the scintillator panel 12 is held with the phosphor facing upward.

The scintillator panel 12 placed on the supporting base 32 is located directly under a laser irradiation section of a laser generating apparatus 31 by a supporting base moving device (not shown). The laser generating apparatus 31 emits a laser beam from the laser irradiation section, and the scintillator panel 12 is irradiated with foe laser beam.

On an irradiation condition, a pulsed laser beam with a frequency of 5000 Hz, a beam diameter of 20 µm, and an output of 300 mW is emitted from a YAG-UV (yttrium aluminum garnet crystal; a wavelength of 266 nm). At the cutting process, a scintillator panel 12 is cut out while being moved in the X-direction and the Y-direction by a supporting base moving device (not shown).

As a laser used in the present invention, an ultraviolet laser beam with a wavelength of about 266 nm may be preferably used. A laser beam with a wavelength of about 266 nm enables to process a machining object by a thermal action and to simultaneously disassociate molecular bonds such as a C—H bond and a C—C bond in organic materials.

That is, a phosphor layer is cut out by a thermal action, and a substrate is cut out via disassociation of molecular bonds. For this reason, since a phosphor layer is cut out by a thermal action and a substrate is cut via dissociation of molecular binding, crystal cracks at cut-out portions can be prevented more.

Further, in the case where a substrate is composed of a resin film or glass, a laser cutting can be applied, in the case of resin, the laser cutting apparatus shown in FIG. 6 can be applied especially preferably. That is, this laser cutting apparatus is an especially preferable embodiment of the present invention.

Figure 7:
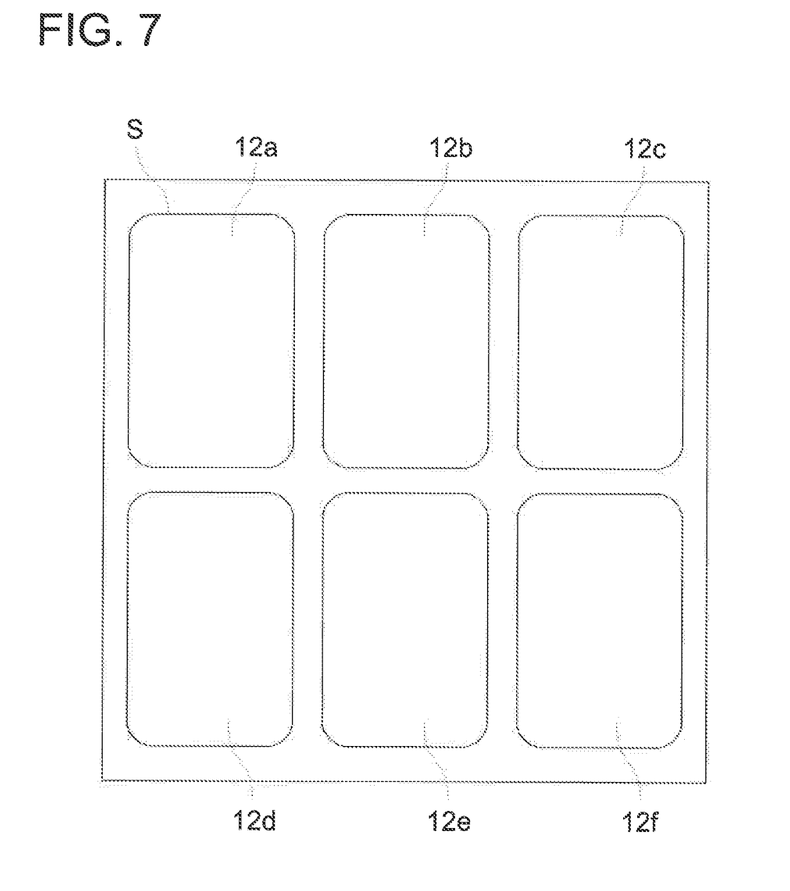
FIG. 7 is a plan view showing a plurality of scintillator panels cut out by cutting.

FIG. 7 shows an example of a plurality of scintillator panels cut out by the laser cutting. The mark S represents laser cut-out portions. That is, a plurality of scintillator panels 12a, 12b, 12c, 12d, 12e, and 12f are cutout from a scintillator panel 12.

<<Coupling Process>>

The cut-out scintillator panel is made to coupling with a light receiving element in a coupling process.

The coupling may be preferably achieved by bonding between the surface of a flat light-receiving element of a light receiving element and the surface of a phosphor layer of a scintillator panel. However, the both surfaces are not needed to adhere to each other. For example, the both surfaces may be brought in close contact with each other by use of a reinforcing plate (glass, or CFRP) or foaming materials such as sponge, or may be brought in close contact with each other by use of an optical grease. Moreover, a flexible transparent film may intervene or be disposed between the surface of a flat light-receiving element of a light receiving element and the surface of a phosphor layer of a scintillator panel.

The bonding may be preferably achieved by use of an adhesive agent, and at the time of bonding, it is desirable to apply a pressure of 10 to 500 g/cm$^2$ until the adhesive agent solidifies.

With the application of the pressure, air bubbles are removed from the adhesive agent layer. In the case where a hot-melt resin is used as a protective layer, it is desirable to heat the hot-melt resin to a temperature higher about 10° C. than a fusion starting temperature of the hot-melt resin while applying a pressure of 10 to 500 g/cm$^2$, then, made to still standing for one to two hours, and thereafter, cooled. In the cooling, it is desirable to cool the hot-melt resin gradually from the viewpoint of prevention of damage on pixels of a light receiving element due to the shrinkage stress of the hot-melt resin.

As the adhesive agent, for example, room temperature-curable adhesive agents, such as an acrylic type, an epoxy type, and a silicone type, may be employed. As an adhesive resin specifically with resiliency, a rubber type adhesive agent may be used.

Examples of resins of the rubber type adhesive agent include block copolymer types such as such as styrene isoprene styrene; synthetic rubber type adhesive agents, such as polybutadiene and polybutylene; and crude rubber.

As examples of commercially-available rubber type adhesive agents, a single liquid component type RTV rubber KE420 (manufactured by Shin-Etsu Chemical Co., Ltd.) may be preferably employed, As a silicone type adhesive agent a peroxide cross-linking type and an addition condensation type may be employed solely or in combination. Further, the silicone type adhesive agent may be used by being mixed with an acrylic type or rubber type adhesive agent, and an adhesive agent in which a silicone component is made to a pendant to a polymer main chain or a side chain of an acrylic type adhesive agent.

In the case where an acrylic resin is used as an adhesive agent, it is desirable to use a resin in which a radical polymerizable monomer containing an acrylic ester including an acrylic side chain with 1 to 14 carbon atoms is made to react as a monomer component. Further, it is desirable to add an acrylic ester including polar groups, such as a hydroxyl group, a carboxyl group, and an amino group, in a side chain and other vinyl type monomers as a monomer component.

Moreover, as a compound disposal or intervening between a scintillator panel and a light receiving element, an optical grease and the like with adhesion may be used. If having a high transparency and adhesion, any well-known compound may be used. As examples of the commercially-available optical grease. Silicone oil KF96H (one millionCS: manufactured by Shin-Etsu Chemical Co., Ltd.) and the like may be used preferably.

A light receiving element has a surface of a flat light-receiving element which includes a plurality of pixels arranged in a two-dimensional form. As the light receiving element, any light receiving element which have sensors, such as well-known CMOS, may be used without being limited especially.

The scintillator panel and the light receiving element having subjected to the coupling are accommodated in a case.

The moisture vapor permeability of the case which constitutes a flat panel detector, is preferably 50 g/m$^2$·day (40° C. and 90% RH) (measured in accordance with JIS Z0208) or less on the basis of an area average on the whole surface area in consideration of protection performance and deliquescence of a phosphor layer, and more preferably 10 g/m$^2$·day (40° C. and 90% RH) (measured in accordance with JIS Z0208) or less.

The flat panel detector according to the present invention is used by being irradiated with X-rays from either one of the scintillator panel side and the light receiving element side. In the case where aluminum or glass with a low X-ray permeability is used as a substrate, it is preferable to irradiate X-rays from the flat panel detector side. Specifically, in the case where aluminum or glass with a thickness of 0.5 mm or more is used as a substrate, X-ray irradiation from the TFT side makes the utilization efficiency of X-ray higher than that from other sides. Examples of X-ray irradiation from the light receiving element side are disclosed by Japanese Unexamined Patent Publication Nos. 07-27864 and 2005-203708, Official Report.

Moreover, in the case where a resin film with a high X-ray permeability is used as a substrate of a scintillator panel, X-ray irradiation from the scintillator side makes fee utilization efficiency of X-ray higher man that, from other sides.

EXAMPLE

Although the present invention will be explained in detail hereafter with reference to examples, the present invention is not limited to these examples.
(Production of Substrate)

A reflecting layer (0.1 μm) was formed on each of the following Substrates with a size of 600×600 mm by spattering silver.

| Substrate | Material | Thickness |
|---|---|---|
| A-1 | Aluminium | 0.2 mm |
| A-2 | Aluminium | 0.3 mm |
| A-3 | Aluminium | 0.5 mm |
| A-4 | Aluminium | 1.0 mm |
| A-5 | Aluminium | 1.5 mm |
| C-1 | Amorphus carbon | 0.5 mm |
| C-2 | Amorphus carbon | 1.0 mm |
| G-1 | Glass | 1.0 mm |
| P-1 | Polyimide film | 0.03 mm |
| P-2 | Polyimide film | 0.05 mm |
| P-3 | Polyimide film | 0.125 mm |
| P-4 | Polyimide film | 0.225 mm |
| P-5 | Polyethylenenaphthalate | 0.125 mm |

(Production of Comparative Substrate (BL-1, -2))

As comparative example, a substrate made of amorphous carbon with a thickness of 1.0 mm cut out beforehand in a size of 24.7 mm×49.3 mm was prepared, and the substrate was not subjected to a cutting process and designated to Comparative substrate BL-1.

A substrate made of polyimide film with a thickness of 0.125 mm cut out beforehand in a size of 24.7 mm×49.3 mm was prepared, and the substrate was not subjected to a cutting process and designated to Comparative substrate BL-2.
(Production of an Undercoating Layer)

A mixed material obtained by the following formulation was dispersed via a bead mill for 15 hours, thereby preparing a coating liquid for an undercoating layer. The resultant coating liquid was coated on the reflecting layer side of each of the above substrate by a spin coater so as to form a dry layer thickness of 1.0 μm, followed by being dried, at 100° C. for 8 hours, thereby producing an undercoating layer.

| | |
|---|---|
| Vylon 20SS (polymer polyester resin: manufactured by Toyobo Co., Ltd.) | 300 parts by weight |
| Methyl ethyl ketone (MEK) | 200 parts by weight |
| Toluene | 300 parts by weight |
| Cyclohexanone | 150 parts by weight |

(Formation of a Phosphor Layer)

Phosphor (CsI:0.03 Tl mol %) was vapor-deposited on the undercoating layer side of the substrates by use of the vapor depositing apparatus shown in FIG. 3, whereby a phosphor layer with a thickness of 200 μm was formed on all over the surface of each of foe substrates. At this time, a shutter (not-shown) was disposed between a boat 963 and a holder 964 such that materials other than a target, object, was prevented from adhering on the phosphor layer at the time of start of vapor deposition.

That is, first, the phosphor raw material was filled as a vapor deposition source in a resistance heating crucible, each of the substrates was installed on a rotatable substrate holder, and a space between the substrate and the evaporation source was adjusted to 500 mm.

Successively, the inside, of the vapor depositing apparatus was once exhausted, and a degree of vacuum was adjusted to 0.5 Pa by introducing an Ar gas. Thereafter, the temperature of each of the substrates was kept at 200° C. while rotating the substrates at a rate of 10 rpm. Subsequently, the resistance heating crucible was heated and the phosphor layer was formed on each of the substrate, thereby obtaining scintillator panels. At this time, in order to secure the substrates to the holder 964, an adhesive gel-like sheet (αGEL: manufactured by Taica Corporation) was used.
(Formation of a Protective Layer)

The scintillator panels obtained in the above (except Substrates P-2, P-3, P-4, and P-5) were set in a CVD apparatus shown in FIG. 4, whereby the protective layer composed of poly paraxylene was formed on each of them. The thickness of the poly paraxylene layer was adjusted to become 3 μm.

However, with reference to Substrates P-2, P-3, P-4, and P-5 made of a resin film, after being cut out in a predetermined size at a below-mentioned cutting process of the scintillator panel, the protective layer composed of poly paraxylene with a thickness of 3 μm was formed on each of them by the CVD apparatus.
(Cutting of a Scintillator Panel)

As shown in Table 1, Scintillator panels 1 to 16 corresponding to the above-mentioned Substrates were produced as follows.

Scintillator panels having Substrate A-1 to A-5, C-1 to C-2, G-1, and P-1 were cut out in a size of 24.7 mm×49.3 mm by a blade dicing apparatus shown in FIG. 5, thereby obtaining Scintillator panels 1-9 were obtained.

Further, Scintillator panels having Substrates P2 to P5 were cut out in a size of 24.7 mm×49.3 mm by a laser cutting apparatus (YAG-UV) shown in FIG. 6, and thereafter, the above protective layer was formed on each of the cut-out Scintillator panels, thereby obtaining Scintillator panels 10 to 13. At this time, Scintillator panel having Substrates P3 was press-cut by a press-cutting die, thereby obtaining Scintillator panel 14.

These Scintillator panels were, sealed with a film having a moisture transmission rate of 0.1 g/m$^2$ (measured in accordance with JIS Z0208) and left on still standing in an air-not-conditioned room for seven days, and thereafter, they were coupled to the below-mentioned light receiving element by pasting.
(Pasting to a Light Receiving Element)

A light receiving element (Rad Eye 1 with a pixel size of 48 μm, manufactured by Rad-icon Corporation) with an effective image region of 24.6×49.2 mm by a CMOS having a size of 24.7×49.3 mm was used. For pasting to the surface of the CMOS, an acrylic adhesive with the following composition was prepared. This acrylic adhesive with the following composition has a high removability, and its pasted position can be easily shifted before heat pressure bonding.

An aromatic isocyanate compound (B) was added in an amount of 5 parts by weight to 100 parts by weight of a mixture with the following solid component ratio (A). Furthermore, 60 ppm of dioctyl tin dilaurate to the solid component was added into the above compounds, followed by being diluted with ethyl acetate, thereby obtaining an adhesive composition with 30% of the solid content.

(A)

| | |
|---|---|
| 2-ethylhexyl acrylate | 50 parts by weight |
| Butyl acrylate | 30 parts by weight |
| Styrene | 19 parts by weight |
| 2-hydroxyethyl methacrylate | 3 parts by weight |

(B)

Tolylene diisocyanate trimethylolpropane adduct (Tradename; Coronate L, manufactured by Japan Polyurethane Corporation)

The above adhesive composition was coated on the protective layer side of a scintillator panel being one of the above Scintillator panels so as to form a thickness of 10 μm, followed by being dried, and thereafter, the respective positions of me scintillator panels and the CMOS section were made to conform perfectly to each other while being confirmed by a stereo microscope. Subsequently, the born of the scintillator panel and the image receiving element were heated at the environment of 70° C. while being pressed with a pressure of 100 g/cm2 for 90 minutes, and then cooled gradually, whereby the scintillator panels and the image receiving element were coupled to each other.

Next, a cable for taking out signals is connected to a connector section of the light receiving element (Rad eye 1), and then the scintillator panel and the image receiving element were set again in the CVD device shown in FIG. 4, whereby the whole surfaces of both of the scintillator panel and the image receiving element were covered with a poly paraxylylene film with a thickness of 50 μm so as to form a moisture-impermeable housing body, thereby obtaining Flat panel detectors 1 to 16.

(Evaluation of Flat Panel Detectors)

From both of the scintillator panel side and the light receiving element side of each of Flat panel detectors obtained in the above, X rays of 10 mR were irradiated with a lamp voltage of 28 kVp, and then obtained digital signals were recorded in a hard disk. Next, the recorded digital signals in the hard disk were analyzed by a computer, thereby obtaining the average intensity S of the electric signals of image signals and calculating the brightness. The signal value obtained in the case where the X rays were irradiated from the scintillator panel side of each of Flat panel detectors was set to 100, and the relative values to the signal value of 100 are indicated in Table 1.

(Defective Portions in Image Peripheral Portions)

The solid image in the effective imaging region of 24.6× 49.2 mm obtained by the irradiation of X rays from the scintillator panel side was analyzed, and the number of image defective portions in the image peripheral positions in which image defects were continued to two pixels or more were counted, and the count values axe indicated in Table 1.

At this time, in Flat panel detectors 14 and 15, in order to reduce the number of image defective portions in the image peripheral portions, it was necessary to use the substrate with a size of 60 mm×35 mm. Accordingly, in this case, since an area larger than that of the light receiving surface of the light receiving element was needed, miniaturization was not able to be attained.

TABLE 1

| Flat panel detector | Scintillator panel | Substrate | Cutting method | Number of defect portions in the periphery of an image | Brightness (X-ray radiation from the scintillator panel side) | Brightness (X-ray radiation from the light receiving element side) | Remarks |
|---|---|---|---|---|---|---|---|
| 1 | 1 | A-1 | Blade dicing | 4 | 80 | 51 | Inv. |
| 2 | 2 | A-2 | Blade dicing | 0 | 72 | 52 | Inv. |
| 3 | 3 | A-3 | Blade dicing | 0 | 45 | 51 | Inv. |
| 4 | 4 | A-4 | Blade dicing | 0 | 25 | 51 | Inv. |
| 5 | 5 | A-5 | Blade dicing | 3 | 18 | 50 | Inv. |
| 6 | 6 | C-1 | Blade dicing | 0 | 108 | 51 | Inv. |
| 7 | 7 | C-2 | Blade dicing | 0 | 100 | 52 | Inv. |
| 8 | 8 | G-1 | Blade dicing | 0 | 41 | 52 | Inv. |
| 9 | 9 | P-1 | Blade dicing | 3 | 116 | 51 | Inv. |
| 10 | 10 | P-2 | Laser dicing | 0 | 115 | 50 | Inv. |
| 11 | 11 | P-3 | Laser dicing | 0 | 114 | 52 | Inv. |
| 12 | 12 | P-4 | Laser dicing | 1 | 112 | 51 | Inv. |
| 13 | 13 | P-5 | Laser dicing | 0 | 114 | 51 | Inv. |
| 14 | 14 | P-3 | Punching | 0 | 115 | 51 | Inv. |
| 15 | 15 | BL-1 | Null | 479 | 100 | 52 | Comp. |
| 16 | 16 | BL-2 | Null | 298 | 114 | 51 | Comp. |

Inv.: Inventive
Comp.: Comparative

From Table 1, it turned out that Flat panel detectors 1 to 14 obtained by the manufacturing method of the present invention maintained high brightness, and had very few defective portions in the image peripheral portions and wide effective image regions.

EXPLANATION OF REFERENCE SYMBOLS

1 Flat panel detector
11 Light receiving element
12 Scintillator panel
13 Adhesive layer
14 Housing body
31 Laser cutting device
32 Supporting base
33 Purge chamber
34 Discharge pipe
35 Light transmissive window
111 Signal taking-out section
121 Substrate
122 Phosphor layer
123 Protective layer
961 Vapor deposition apparatus
962 Vacuum container
963 Boat
964 Holder
965 Rotating mechanism
966 Vacuum Pump
S Laser cut-out portion

The invention claimed is:

1. A manufacturing method for manufacturing a flat panel detector that comprises a flat light-receiving element including a plurality of pixels arranged in a two dimensional form and a scintillator panel including a substrate and a phosphor layer composed of columnar crystals formed on the substrate, wherein a surface of the phosphor layer of the scintillator panel is made coupling to a surface of the flat light-receiving element;
   the manufacturing method comprising:
      scintillator panel producing process which produces a scintillator panel with an area larger than that of a surface of the flat light-receiving element;
      a cutting process which cuts out the scintillator panel obtained by the scintillator panel producing process in response to the area of the surface of the flat light-receiving element; and
      a process of coupling a cut-out scintillator panel to the surface of the flat light-receiving element.

2. The manufacturing method described in claim 1, further comprising:
   a protective layer forming process of forming a protective layer on the phosphor layer before the cutting process.

3. The manufacturing method described in claim 2, wherein the protective layer is a resin, and the resin is made to adhere to the phosphor layer.

4. The manufacturing method described in claim 3, wherein the resin is poly paraxylylene or a hot-melt resin.

5. The manufacturing method described in claim 1, wherein the substrate contains carbon, aluminium, or glass as a main composition.

6. The manufacturing method described in claim 5, wherein the substrate has a thickness of 0.3 mm or more and 1.0 mm or less.

7. The manufacturing method described in claim 5, wherein the phosphor layer has a thickness of 0.8 mm or less.

8. The manufacturing method described in claim 1, wherein the substrate is made of resin.

9. The manufacturing method described in claim 8, wherein the resin contains at least one of polyimide (PI) and polyethylenenaphthalate (PEN).

10. The manufacturing method described in claim 8, wherein the substrate has a thickness of 0.05 mm or more and 0.2 mm or less.

11. The manufacturing method described in claim 8, wherein the phosphor layer has a thickness of 0.6 mm or less.

12. The flat panel detector manufacturing method described in claim 8, wherein the cutting process is achieved by at least one of a laser beam, a punching die, and a blade.

13. The flat panel detector manufacturing method described in claim 1, wherein the cutting process is a dicing process.

14. A manufacturing method for manufacturing a flat panel detector that comprises a flat light-receiving element including a plurality of pixels arranged in a two dimensional form and a scintillator panel including a substrate and a phosphor layer composed of columnar crystals and a protective layer formed in this order on the substrate, wherein a surface of the phosphor layer of the scintillator panel is made coupling to a surface of the flat light-receiving element;
   the manufacturing method comprising:
      a scintillator panel producing process which produces a scintillator panel with an area larger than that of a surface of the flat light-receiving element;
      a cutting process which cuts out the scintillator panel obtained by the scintillator panel producing process in response to the area of the surface of the flat light-receiving element; and
      a process of coupling a cut-out scintillator panel to the surface of the flat light-receiving element, and further
      a protective layer forming process of forming a protective layer on the phosphor layer after the cutting process.

15. The manufacturing method described in claim 14, wherein the protective layer is a resin, and the resin is made to adhere to the phosphor layer.

16. The manufacturing method described in claim 15, wherein the resin is poly paraxylylene or a hot-melt resin.

17. The manufacturing method described in claim 14, wherein the substrate contains carbon, aluminium, or glass as a main composition.

18. The manufacturing method described in claim 17, wherein the substrate has a thickness of 0.3 mm or more and 1.0 mm or less.

19. The manufacturing method described in claim 17, wherein the phosphor layer has a thickness of 0.8 mm or less.

20. The manufacturing method described in claim 14, wherein the substrate is made of resin.

21. The manufacturing method described in claim 20, wherein the resin contains at least one of polyimide (PI) and polyethylenenaphthalate (PEN).

22. The manufacturing method described in claim 20, wherein the substrate has a thickness of 0.05 mm or more and 0.2 mm or less.

23. The manufacturing method described in claim 20, wherein the phosphor layer has a thickness of 0.6 mm or less.

24. The manufacturing method described in claim 20, wherein the cutting process is achieved by at least one of a laser beam, a punching die, and a blade.

25. The manufacturing method described in claim 14, wherein the cutting process is a dicing process.

26. A manufacturing method for manufacturing a flat panel detector that comprises a flat light-receiving element including a plurality of pixels arranged in a two dimensional form and a scintillator panel including a substrate and a phosphor layer composed of columnar crystals formed on the substrate, wherein a surface of the phosphor layer of the scintillator panel is made coupling to a surface of the flat light-receiving element, and radiation is irradiated from the light receiving element side;

the manufacturing method comprising:
- a scintillator panel producing process which produces a scintillator panel with an area larger than that of a surface of the flat light-receiving element;
- a cutting process which cuts out the scintillator panel obtained by the scintillator panel producing process in response to the area of the surface of the flat light-receiving element; and
- a process of coupling a cut-out scintillator panel to the surface of the flat light-receiving element.

27. The manufacturing method described in claim 26, wherein the substrate contains aluminium, or glass as a main composition.

28. The manufacturing method described in claim 27, wherein the substrate has a thickness of 0.5 mm or more and 1.0 mm or less.

* * * * *